United States Patent [19]

Takahashi et al.

[11] Patent Number: 5,396,341
[45] Date of Patent: Mar. 7, 1995

[54] DATA PROCESSING SYSTEM

[75] Inventors: Toshiharu Takahashi; Takefumi Nosaki, both of Kanagawa, Japan

[73] Assignee: Kabushiki Kaisha Toshiba, Kawasaki, Japan

[21] Appl. No.: 188,243

[22] Filed: Jan. 28, 1994

[30] Foreign Application Priority Data

Mar. 24, 1993 [JP]  Japan .................................. 5-064501

[51] Int. Cl.6 .......................... H04N 1/00; H04N 1/40
[52] U.S. Cl. ................................. 358/400; 358/404; 358/444
[58] Field of Search .............. 358/400, 401, 403, 404, 358/405, 407, 434, 440, 444, 474, 468; 379/100

[56] References Cited

U.S. PATENT DOCUMENTS

| | | | |
|---|---|---|---|
| 4,207,598 | 6/1980 | Reich et al. | 358/440 |
| 4,937,762 | 6/1990 | Todome | 364/521 |
| 5,099,512 | 3/1992 | Shigami et al. | 358/440 |
| 5,115,326 | 5/1992 | Burgess et al. | 358/440 |
| 5,247,591 | 9/1993 | Baran | 358/402 |

*Primary Examiner*—Edward L. Coles, Sr.
*Assistant Examiner*—Jerome Grant, II
*Attorney, Agent, or Firm*—Limbach & Limbach

[57] ABSTRACT

A data processing system for transmitting image data to a plurality of external apparatus, includes a facsimile communication function for transmitting the image data to the external apparatus, a network communication function for transmitting the image data to the external apparatus and a memory for storing selection data to select one of the facsimile communiation function and the network communication function to which image data is to be transmitted corresponding to a destination name. The selection data are corresponded to the destination name. The selection data are read out from the memory for transmitting the image data to one of the facsimile communication function and the network communication function designated by this selection data.

5 Claims, 8 Drawing Sheets

| ID CODES OF NOMINATED DELIVERY DESTINATIONS | PRIORITY 1 | | PRIORITY 2 | |
|---|---|---|---|---|
| | OUTPUT TYPE | OUTPUT DESTINATION ADDRESS | OUTPUT TYPE | OUTPUT DESTINATION ADDRESS |
| 0 0 0 0 0 0 0 0 | LAN | | FAX | |
| 0 0 0 0 0 0 0 1 | FAX | | DEF | |
| 0 0 0 0 0 0 0 2 | DEF | | | |

DATA PROCESSING SYSTEM

BACKGROUND OF THE INVENTION

1. Field of the Invention

The present invention relates to a data processing system provided with at least two of the functions in which a copying function to print the image information of originals read through a scanner on papers, a function to transmit such information by facsimile, a function to transmit such information by network communication, and a function to record such information on recording media such as optical disks.

2. Description of the Related Art

In general, as shown in U.S. Pat. No. 4,937,762 (Jun. 26, 1990), a data processing system is provided with a function to print the image information of originals read through a scanner on papers, a function to transmit such information by facsimile, a function to transmit such information by network communication, and a function to record such information on recording media such as optical disks. In other words, the data processing system can output the identical image information using a desired function by presetting or selecting it.

For example, to copy an original, transmit it by facsimile communication and then network communication in this order using a conventional data processing system, a user will place the original on an original table of a scanner first. Subsequently, the user will select a copy mode, set a number of copies and then operates a start key on an operation panel.

As a result, the original on the original table will be read, and the resultant image information will be stored in an image information memory. At the same time, the image information will be copied on a paper. After the completion of the copy, the user will select a facsimile communication mode, set transmission destination information (phone numbers, abbreviated numbers preset in accordance with specific phone numbers, and so on), end then operates the start key.

As a result, the image information stored in the image information memory will be transferred by facsimile in accordance with a specified facsimile communication procedure. After the completion of the facsimile communication, the user will then select a network communication mode, set transmission destination information (network addresses of transmission destinations, ID codes preset in accordance with specific network addresses, and so on), and then operates the start key.

As a result, the image information stored in the image information memory will be transferred by network communication in accordance with a specified protocol.

Thus, to output the image of the identical original by a plurality of different methods using a data processing system, it is required to operate the operation panel to set information required for the execution of the desired output function each time.

As mentioned above, the conventional data processing system enable not only the copy of the identical original but also the output by facsimile or network communication, which makes them very effective in delivering the identical document to a plurality of destinations. However, they call for troublesome operations special for each output function. For the conventional data processing system, in addition, an output function cannot be started before the completion of the preceding processing, and this waiting time in operation makes them inefficient.

SUMMARY OF THE INVENTION

It is an object of the present invention to provide a data processing system which outputs the image of the identical original through a plurality of different functions by simple operation without any waiting time, and which accordingly improves the operability and the processing efficiency.

According to the present invnetion there is provided a data processing system for transmitting image data to a plurality of external apparatus, comprising facsimile communication means for transmitting the image data to the external apparatus, network communication means for transmitting the image data to the external apparatus, means for designating a destination name which is transmitted the image data, means for storing selection data to select one of the facsimile communiation means and the network communication means to which image data is to be transmitted corresponding to the destination name designated by the designating means, and means for reading out the selection data from the storing means corresponding to designated destination name if the destination name is designated by the designating means and for transmitting the image data to one of the facsimile communication means or the network communication means designated by this selection data.

DETAILED DESCRIPTION OF THE PREFERRED EMBODIMENTS

Figure 1:
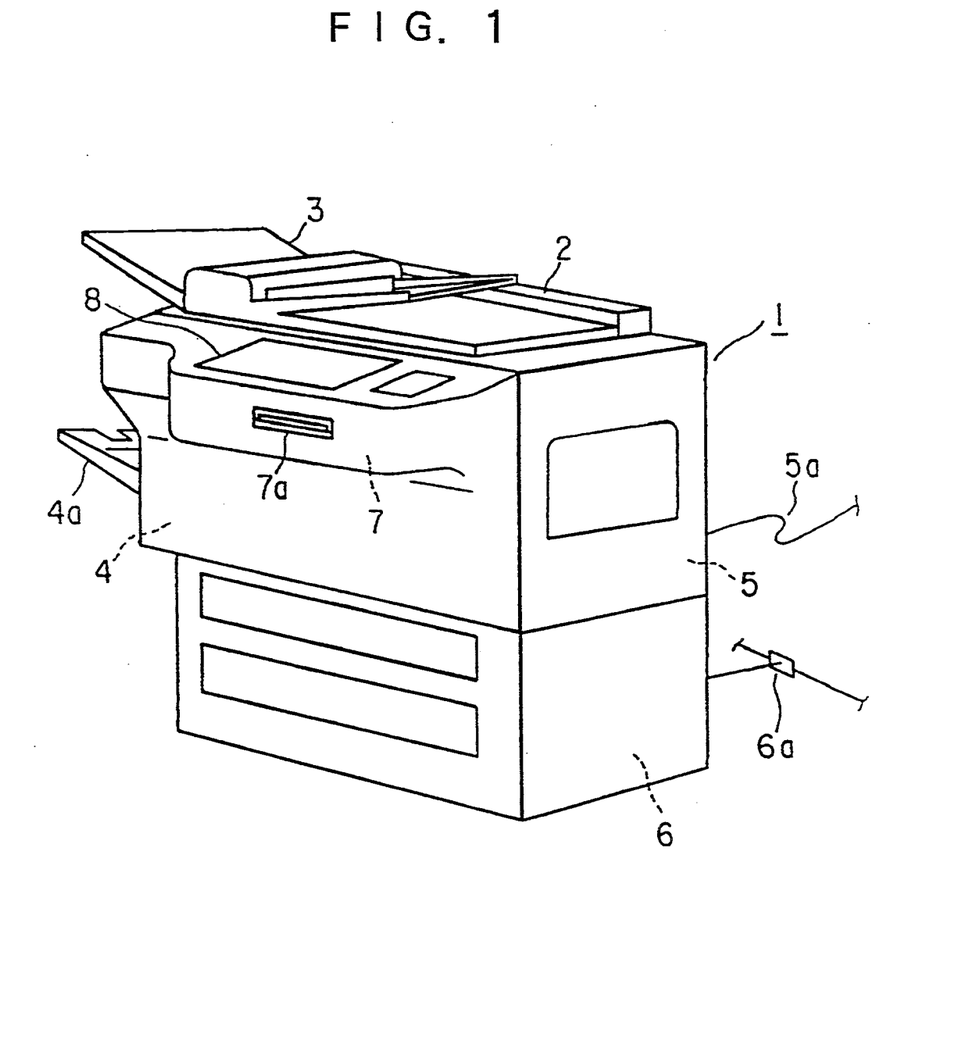
FIG. 1 is a perspective view showing the appearance of a data processing system of the present invention.

An example of the embodiments of the present invention will now be described with reference to the drawings. FIG. 1 is a perspective view showing the appearance of the data processing system in this example of embodiment. The system is provided with a scanner 2, as an original reading means, on the top of a main body 1. The scanner 2 is provided with an automatic original feeder 3 which automatically feeds originals in the form of sheet one by one, and further the scanner 2 is applicable to those in the form of booklet.

The system is also provided with a built-in a printer 4, a facsimile controller 5, a network controller 6, and an optical disk drive 7 as means for outputting the image information of originals read by the scanner 2.

The printer 4 is a laser printer which applies a laser beam to a photosensitive body to form an electrostatic latent image of the image information, develops the latent image by toner, and subsequently transfers the developed image onto recording papers to print it thereon. Printed recording papers are discharged onto a receiving tray 4a from the side of the main body 1.

The facsimile controller 5 comprises a modem, which serves as a connection interface with public telephone lines in accordance with the facsimile communication procedure, a transmission/reception buffer, and a processor which controls them. The facsimile controller 5, connected to public telephone lines through a modular cable 5a, transmits and receives the image information.

The network controller 6 comprises a connection interface for connection with a LAN (Local Area Network), and a processor which controls the LAN communication protocols. The network controller 6, connected to the LAN through a cable 6a, transmits and receives the image information.

The optical disk drive 7 records the compressed image information on an optical disk loaded from an optical disk slit 7a arranged in the front of the main body 1.

Figure 2:
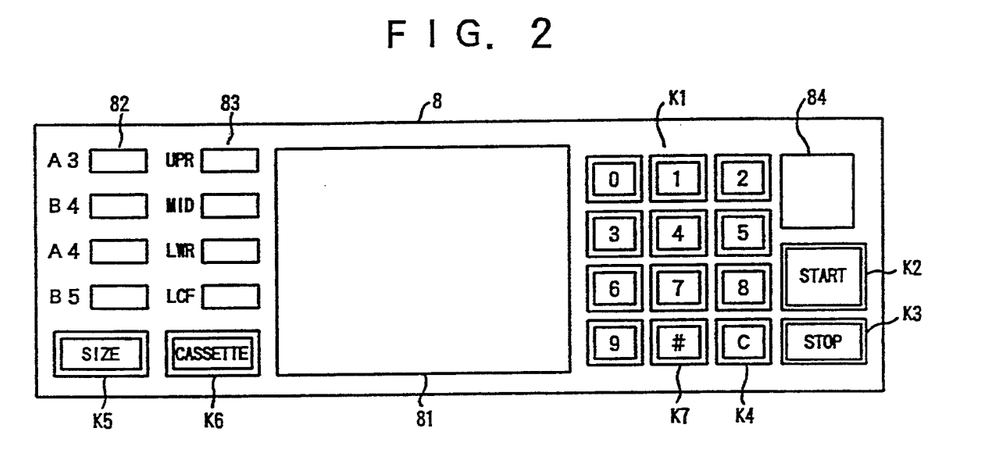
FIG. 2 is a plan view showing an operation panel of the data processing system shown in FIG. 1.

The main body 1 has, on the front side of the top thereof, an operation panel 8 constituted as shown in FIG. 2. That is, the operation panel 8 comprises a touch panel display 81 which displays the image information of originals read by the scanner 2, a ten-keys K1, a start key K2, a stop key K3, a clear key K4, an original size key K5, a paper cassette selection key K6 and a #-key K7. In addition, the operation panel 8 contains LEDs 82 for confirming document sizes, for example, A3, B4, A4 and B5 sizes, LEDs 83 for confirming selected paper cassettes, for example, an upper cassette (UPR), a middle cassette (MID), a lower cassette (LWR) and a large capacity feeding cassette (LCF), and LEDs 84 for confirming print numbers. The surface of the touch panel display 81 is composed of a transparent resistor and electrodes.

Figure 3:
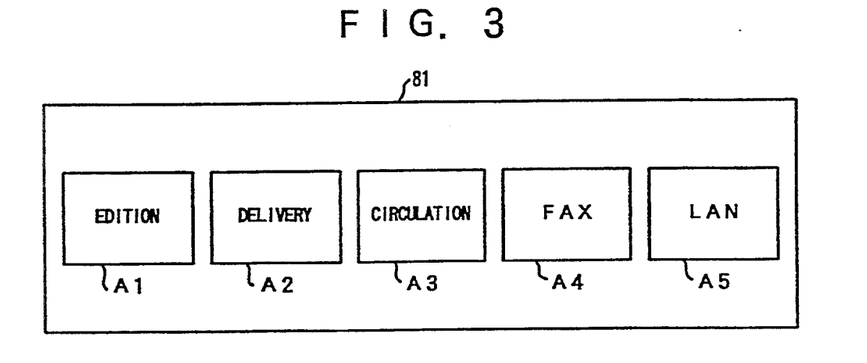
FIG. 3 is a plan showing an initial screen of a touch panel display in the operation panel shown in FIG. 2.

The touch panel display 81 displays as the initial screen, shown in FIG. 3, character areas A1 to A5 for selecting one among an edition mode, a delivery mode, a circulation mode, a facsimile communication mode and a LAN transmission mode.

The edition mode enables editing the images of originals read by the scanner 2, including the enlargement/reduction of original images. The facsimile communication mode enables transmitting image information by facsimile. The LAN transmission mode enables transmitting image information using LAN.

On the other hand, the delivery and circulation modes are to output a plurality of image information with respect to the identical image information. The touch panel display 81 provides a means for mode selection, and the modes are selected thereby.

Figure 4:
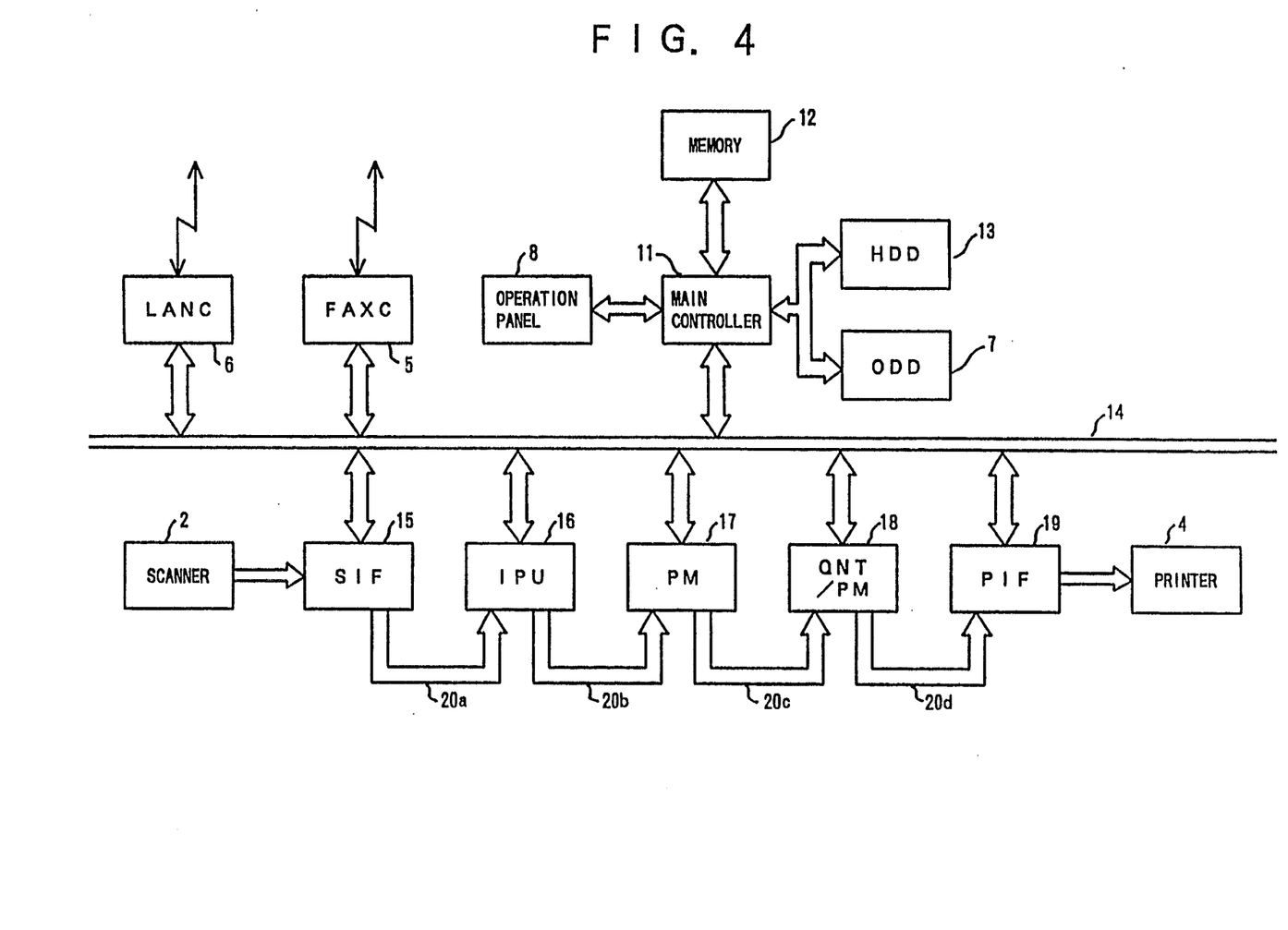
FIG. 4 is a block diagram showing the internal configuration of the data processing system of the present invention.

FIG. 4 shows the block diagram illustrating the internal configuration of the data processing system of the present invention. A main controller 11, which controls the entire operation of the system, comprises a CPU, a ROM containing control programs of the CPU, and so on. The main controller 11 controls the operation panel 8, a memory 12, a hard disk drive 13, and the optical disk drive 7.

Figure 5:
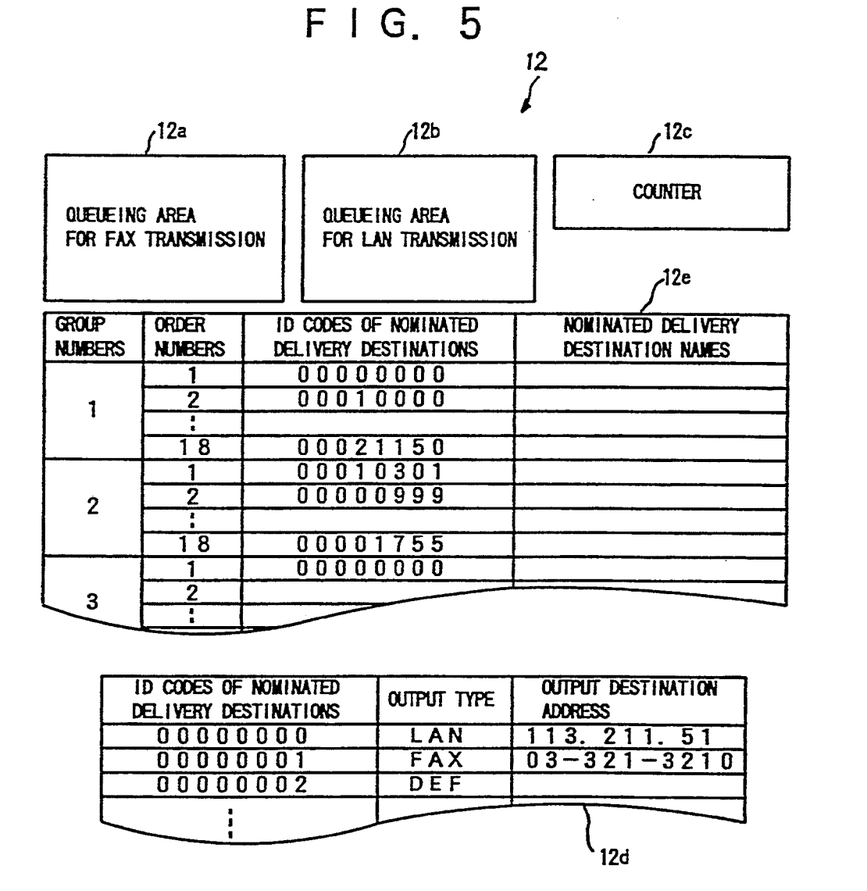
FIG. 5 is a schematic diagram showing major memory areas in a memory in the internal configuration shown in FIG. 4.

As shown in FIG. 5, the memory 12 includes a queueing area for facsimile communication 12a, a queueing area for LAN transmission 12b, a counter 12c, a delivery destination administer table 12d, and a group number administer table 12e. The queueing area for facsimile communication 12a administers the information of facsimile communication destinations (i.e. phone numbers, abbreviated dial numbers, and so on). The queueing area for LAN transmission 12b administers the information of network transmission destinations (i.e. network addresses, user IDs, and so on). The counter 12c counts the numbers of prints. The delivery destination and group number administer tables 12d and 12e are used for the operation in the delivery mode. These queueing areas for transmission are administered on a FIFO (first-in first-out) basis, that is, the transmission is basically executed in preset order.

In the delivery destination administer table. 12d, identification codes (ID codes composed of an 8-digit serial decimal number) identifying individual nominated delivery destinations (nominated destination name, title, section, and so on) for image information obtained from originals, are referred to. Further, a means for image information output corresponding to each of the delivery destinations, is defined. For example, the facsimile communication can be used for a nominated delivery destination connected through a public telephone line. So, an output type of "FAX" is defined, and further, corresponding facsimile phone number information is administered as an output destination address. The network transmission can be used for a nominated delivery destination connected through a privately leased line (LAN). So, an output type of "LAN" is defined, and further, corresponding network address information is administered as an output destination address. On the contrary, for a delivery destination connected through neither of these lines, an output type of "DEF" referring to copy is defined. It is possible to define an optical disk for the output destination address to store the image information of originals in the optical disk.

Figure 6:
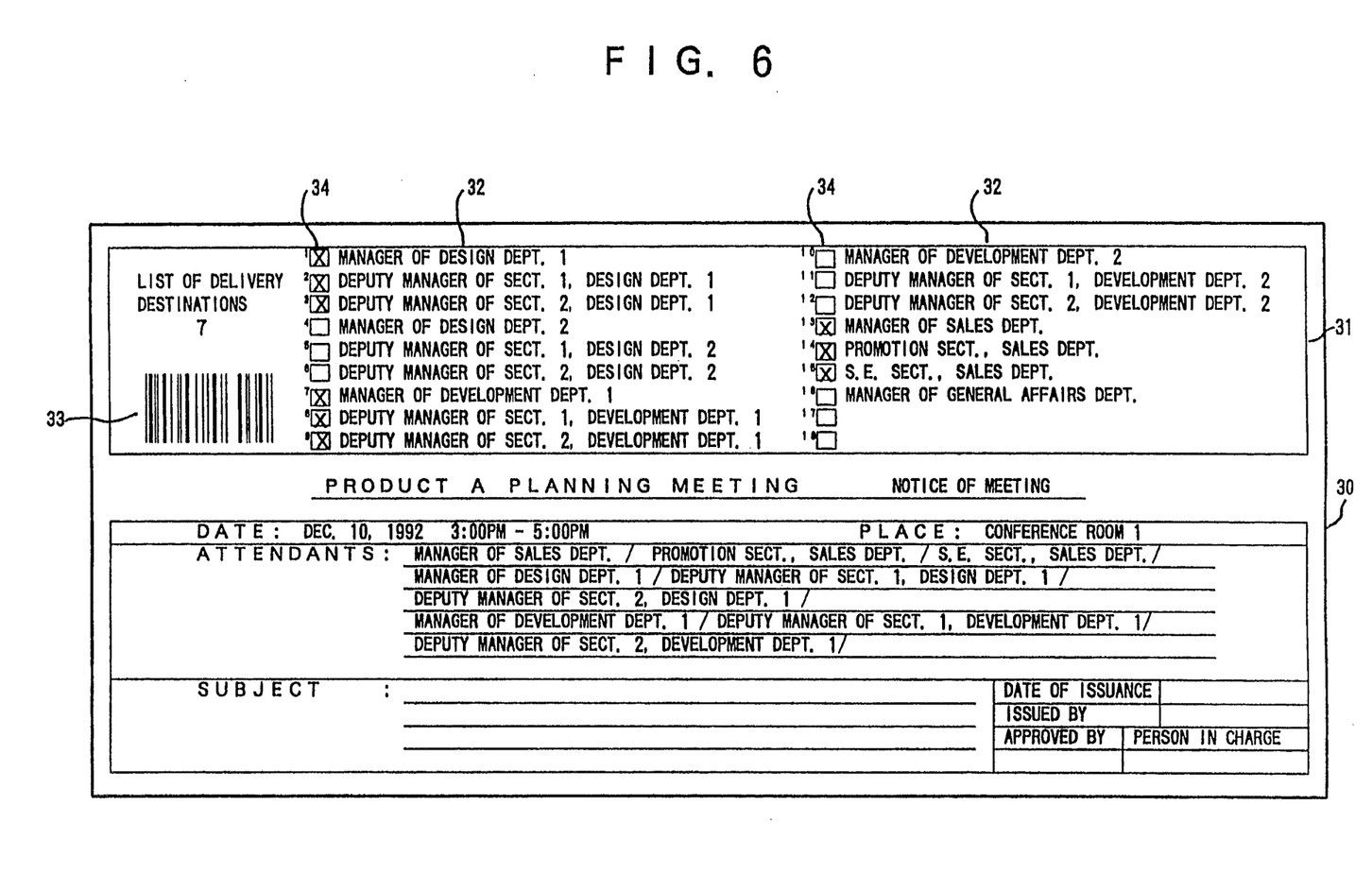
FIG. 6 is a plan view showing an example of formats for documents to be delivered used in the data processing system of the present invention.

The group number administer table 12e is constituted of group numbers, order numbers, identification codes, and nominated delivery destination names. The group numbers simultaneously specify a plurality of nominated delivery destinations. The order numbers I to 18 are assigned to one group number. The identification codes (IDs) correspond to each group number and identify nominated delivery destinations contained in each group number. The nominated delivery destination names are stored in the memory 12 in accordance with order numbers (from upper left to lower right, 1 to 18 in the example) in nominated delivery destination name columns 32 printed in a list section 31 on an original 30 to be delivered (FIG. 6).

The original 30, as a medium in the form of sheet, has a bar code printed in its identification mark column 33, the bar code corresponds to one of the group numbers administered through the group number administer table 12e, identifying the group number. Moreover, the nominated delivery destination name columns 32 has nominated delivery destination names belonging to the group number printed. Selection mark boxes 34 are formed in the nominated delivery destination name columns 32, and the user will give a marking ("X" in the example of FIG. 6) to designate for nominated delivery destination to which he/she desires to deliver the image information obtained from the original, and thereby specify the destinations. The bar code in the identification mark column 33 is of eight digits, the four them is a mode type to determine whether to deliver the image information obtained, and the other four digits represent a group number.

The hard disk drive 13 is used as a area for storing compressed image information waiting for transmission. This enables the data processing system to process a large quantity of originals. The storage capacity of the hard disk drive 13 is 40 MB, and expandable.

The main controller 11 is connected to the facsimile controller 5, the network controller 6, a scanner interface 15, an image processor 16, a multivalued page memory 17, a binarization page memory & compression/expansion circuit 18, and a printer interface 19 through a system bus 14.

The scanner interface 15 is to receive image information from the scanner 2. The printer interface 19 is to transfer binarized image information to the printer 4.

The image processor 16 performs high-quality image processing depending on the printer 4, and edits images, that is, enlarges or reduces images. The multivalued page memory 17 stores image information as multivalued bit information per pixel.

The binarization page memory & compression/expansion circuit 18 consists of a binarizing part which binarizes multivalued image information, a binary page memory which stores image information binarized by the binarizing part, and a compression/expansion processor which compresses and expands binary image information. The binary page memory has a storage capacity equivalent to several pages so that the copy, image transmission and reception can be simultaneously executed in parallel.

Also, connection is provided by image buses 20a to 20d between the scanner interface 15, image processor 16, multivalued page memory 11, binarization page memory & compression/expansion circuit 18, and printer interface 19.

The image buses 20a to 20d are provided especially for the operation as a copier of the data processing system. To ensure the real time operation of the copier, image data form the scanner 2 is received by the scanner interface 15, upgraded to obtain higher image quality and enlarged/reduced by the image processor 16, and outputted to the printer 4 through the printer interface 19, further, these operations are executed in parallel.

Among the units connected to the image buses 20a to 2d, ones unnecessary for the current operation are passed over. In a mere copying operation, for example, the binarization page memory & Compression/expansion circuit 18 is unnecessary, and is passed over. In facsimile communication, the image processor 16 and the multivalued page memory 17 are passed over. To "pass over" a unit means that data is not processed thereby.

To copy an original using the data processing system, the user sets a number of copies with the ten-keys K1 on the operation panel 8. The counter 12c is set to the set number of copies. If no number of copies is set, the number of "1" is automatically set. If he/she needs to edit an image, the user touches the edition mode area A1 in the touch panel display 81 on the operation panel 8 to display the image edition menu thereon. The user then makes a selection from the displayed menu to set up for a desired edition. Subsequently, he/she sets an original on the scanner 2 and operates the start key K2.

The operations above by the user cause the main controller 11 to deliver a drive command to the scanner 2. Consequently, the image information of the original read by the scanner 2 is, transferred to the printer interface 19, being processed, through the scanner interface 15 and the image processor 16. The image of the original is printed by the printer 4 based on the processed image information. The counter 12c counts down each time one copying operation is performed, and the copying is continued until the counter 12c counts "0".

To transmit the image information of an original by facsimile, the user touches the facsimile communication mode area A4 in the touch panel display 81 on the operation panel 8. When the mode area A4 is touched, the touch panel display 81 displays the facsimile input screen. The user then sets transmission destination information (phone numbers, abbreviated dial numbers, and so on) from the facsimile input screen through touch operation. Subsequently, he/she sets an original on the scanner 2, and operates the start key K2.

The operation above by the user cause the main controller 11 to set the transmission destination information in the queueing area for facsimile communication 12a. If there is no image information waiting for transmission in the area 12a, the main controller 11 outputs a drive command to the scanner 2. The scanner 2 reads image information from the original through the scanner interface 15, and the image information read is binarized and compressed by the binarization page memory & compression/expansion circuit 18 for every page of the original. Subsequently, the main controller 11 controls the facsimile controller 5 to send the image information to the first transmission destination information in the queueing area for facsimile communication 12a, that is, the destinations contained in the transmission destination information set at the moment. The line is connected in accordance with the facsimile communication procedure, and the image information is transmitted by facsimile.

To transmit the image information of an original by network communication, the user touches the LAN transmission mode area A5 in the touch panel display 81 on the operation panel 8. When the mode area A5 is touched, the touch panel display 81 displays the network input screen. The user then sets transmission destination information (network addresses, user IDs, and so on) from the network input screen through touch operation. Subsequently, he/she sets an original on the scanner 2, and operates the start key K2.

The operations above by the user cause the main controller 11 to set the transmission destination information in the queueing area for LAN transmission 12b. If there is no image information waiting for transmission in the area 12b, the main controller 11 outputs a drive command to the scanner 2. The scanner 2 reads image information from the original through the scanner interface 15, and the image information read is binarized and compressed by the binarization page memory & compression/expansion circuit 18 for every page of the original. Subsequently, the main controller 11 controls the network controller 6 to send the image information to the first transmission destination information in the queueing area for LAN transmission 12b, that is, the destinations contained in the transmission destination information set at the moment. The line is connected in accordance with the protocol for the network, and the image information is transmitted.

When the mode to store image information in an optical disk has been set in facsimile or network transmission, the main controller 11 controls the optical disk drive. The control stores, in an optical disk, data corresponding to image information binarized and compressed by the binarization page memory & compression/expansion circuit 18.

Description is hereafter given to the delivery mode operation relating to the present invention. The delivery mode is provided in order that the image information obtained from an original can be delivered to a plurality of delivery destinations at almost the same time. For delivery destinations connected through public telephone lines, the image information of an original is sent by facsimile communication. For delivery destinations connected through privately leased lines (LANs), the image information of the original is transmitted by network communication. For delivery destinations connected through neither of these lines, the original is copied by a required number of copies.

Figure 7:
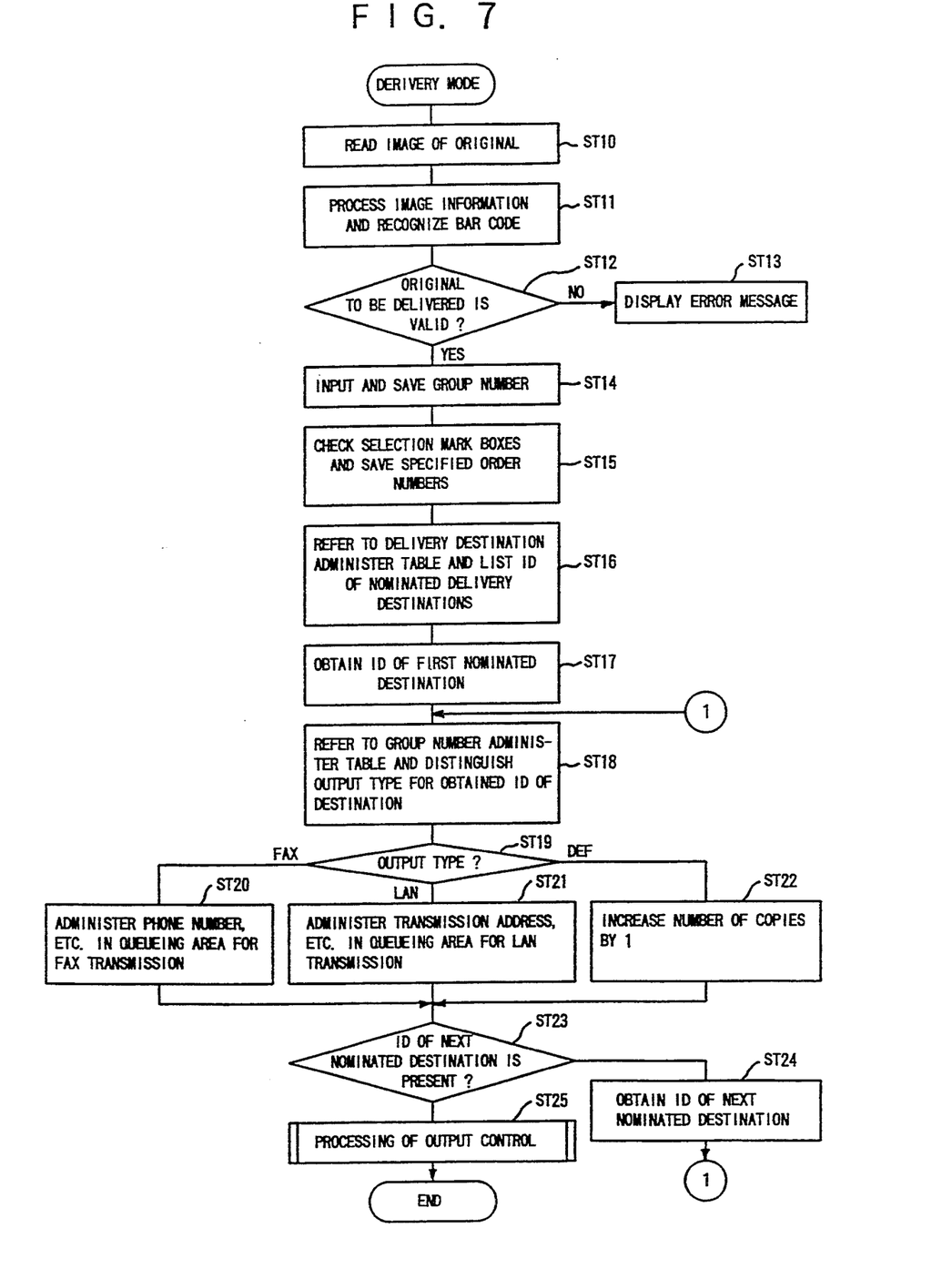
FIG. 7 is a flow chart of a delivery mode processing executed by a main controller of the system of the present invention.

The main controller 11 is so programmed that it will execute the operation shown in the flow chart of FIG. 7 when the delivery mode area A2 is touched in the touch panel display 81 on the operation panel 8 with the original 30 as shown in FIG. 6 set on the scanner 2.

The program is stored in an ROM (not illustrated) contained in the memory 12 in FIG. 4. The main controller 11 reads the program from the ROM in the memory 12, and executes processing in accordance with it.

First, the main controller 11 outputs a drive command to the scanner 2. The image information of an original on the scanner 2 is read through the scanner interface 15 (ST 10). The image information read is binarized by the binarization page memory & compression/expansion circuit 18, and then transferred to the binary page memory.

Then the main controller 11 recognizes and interprets the bar code of the image information in the region corresponding to the identification mark column 33 in the original 30 among the image information stored in the binary page memory (ST11). If it is judged as the result of the interpretation that the mode type of the bar code refers to the delivery of the image information of the original (ST12), then the system proceeds to the next step of operation. In other cases (including cases where the bar code failed to be recognized) in the delivery mode, it is judged that an invalid original is set, and the touch panel display 81 is caused to display an error message, such as "IMAGE INFORMATION OF ORIGINAL NOT FOR DELIVERY" (ST13). Then the operation returns to the waiting state for next operation.

If the mode type of the bar code refers to delivery, the group number contained in the identical bar code is recognized, and is stored in the memory as a delivery group number (group number inputting means) (ST14).

Then the main controller 11 checks the regions in the image information above corresponding to the selection mark boxes 34 in the original 30 sequentially from upper left to confirm whether a marking is provided or not. If it is judged that a marking is provided, the marked order number is stored in the memory (ST15). In case of the original 30 shown in FIG. 6, order numbers, 1, 2, 3, 7, 8, 9, 13, 14 and 15 are stored in the memory as order number with a marking (ST16). Whether a mark is provided or not is judged as follows. If the average pixel density of each boxes 34 is a predetermined value or above, a mark is regarded as present. If the density is below the value, a mark is regarded as absent.

Then the main controller 11 refers to the group number administer table 12e, and determines, for delivery destinations, all nominated delivery destination identification codes corresponding to the order numbers stored in the memory among those corresponding to the group numbers stored in the memory for which delivery is to be executed (delivery destination determining means) (ST17).

Then the main controller 11 searches the identification codes of the determined delivery destinations one by one from the first (in ascending order of the order numbers) (ST18). Each time, the main controller 11 determines, for means for delivery, the output type corresponding to the identification code obtained through reference to the delivery destination administer table 12d (ST19).

For a means for delivery, one is selected among facsimile communication, LAN transmission and copy.

If the output type is "FAX", facsimile communication is specified for output method, and accordingly, a phone number, abbreviated dial number, and so on contained in the output destination address information are set in the queueing area for facsimile communication 12a (ST20). If the output type is "LAN", network transmission is specified for output method, and accordingly, a network address, user ID and so on contained in the output destination address information are set in the queueing area for LAN transmission 12b (ST21). If the output type is "DEF", copy is specified for output method, and accordingly, the counter 12c adds one count (output selecting means) (ST22).

As mentioned above, transmission is sequentially executed using the facsimile or LAN function based on the transmission destination information set in the queueing areas for facsimile and LAN transmissions 12a and 12b.

For all the identification codes obtained as nominated delivery destinations, the identical processing is repeated: setting in the queueing area 12a or 12b or the increase of the print number count (ST23, ST24, ST18 to ST22). After this series of operations has been completed, the system executes processing using its fundamental functions, such as facsimile communication and network communication, and copy functions (output controlling means) (ST25).

In the execution above, with respect to a sheet of original, the system reads and inputs the image information for facsimile communication through the scanner 2 and stores it in the hard disk drive 13; subsequently, it reads and inputs the image information for network communication through the scanner 2 and stores it in the hard disk drive 13; finally it copies the original. The system executes these operations in this order. In case an original has a plurality of pages, the system, after completing a series of operations above for the first page, repeats the same for the following pages.

For input and storage of image information for facsimile communication and network communication, transmission destination information have been already set in the queueing areas for facsimile communication and LAN transmission 12a and 12b. Therefore, the image information obtained through the scanner 2 is binarized and compressed by the binarization page memory & compression/expansion circuit 18, and the thus processed image information is stored in the binary page memory or the hard disk drive 13. This image storage location is registered in the queueing areas 12a and 12b. If an original has a plurality of pages, each time the user repeatedly places a page and operates the start key K2, the main controller 11 inputs and stores the image information in response. When the user finally operates the #-key KT, it terminates the repeated operations of the reading and inputting of image information by the scanner 2 and the storing of the information in the hard disk drive 13.

The transmission is executed through matrix administration. When time for transmission has come, the line is connected, and then compressed data is transmitted in accordance with a respective protocol.

Above is the description of the operation in the delivery mode. The similar operation is executed in the circulation mode as well, in which the image information of the identical original is transmitted to nominated delivery destinations in predetermined order. In this case, the user prepares an original in the same format as of the original 30, and writes the order of circulation in the selection mark boxes 34 in the original 30. Consequently, the main controller 11 recognizes these numbers by checking the selection mark boxes 34, and determines a nominated delivery destination corresponding to Number 1, referring to the group number administer table 12e. Subsequently, it determines the output type (facsimile communication or network communication) for the nominated delivery destination of Number 1, referring to the delivery destination administer table 12d, and then executes the transmission.

As mentioned above, the data processing system delivers or circulates the image information of the identical original read by the scanner 2 to nominated delivery destinations connected through public telephone lines by facsimile communication and to those connected through privately leased lines (LANs) by network communication. For delivery destinations connected through neither of these lines, the system copies the original by a required number of copies for the purpose of delivery or circulation. By simple operations of scanning an original 30 in the specified format and touching an applicable mode area in the touch panel display 81 once, the image information of the original is automatically transmitted to delivery destinations by facsimile communication or network communication, or copied by a required number of copies using the printer 4.

Conventional data processing system call for specific operations before starting each output function. Contrarily, the data processing system of the present invention calls for only one operation before output, largely improving the operability. It also eliminates waiting time in operation, largely improving the processing efficiency as well.

The input of group numbers uses media in the form of sheet (original 30) which have the printed group number identification mark column and the printed selection mark boxes divided by information specific to each delivery destination belonging to the group numbers. Therefore, delivery destinations of the image of an original are easily identified, and specific delivery destinations are further selectable among those belonging to a group number. This makes the system practical.

Figure 8:
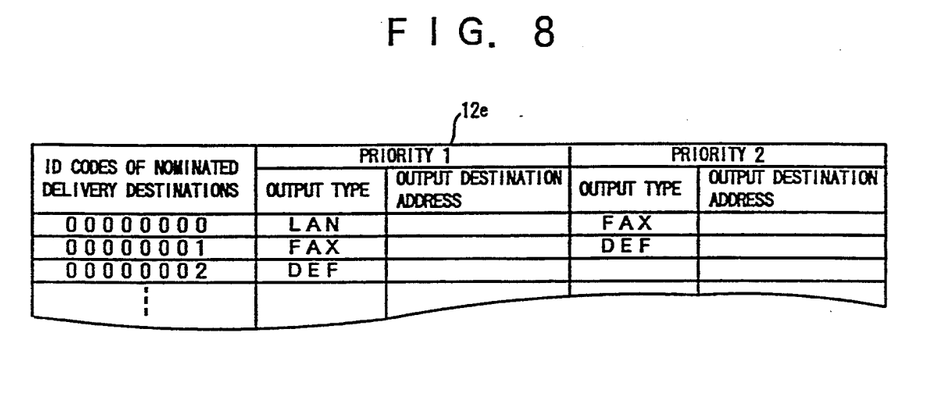
FIG. 8 is a schematic diagram showing an example of the delivery destination administer table alteration.

The present invnetion is not limited to the above embodiment. In the above embodiment, only one type of image information output means is defined for each delivery destination in the delivery destination administer table 12d. However, a plurality of definitions may be given with priorities assigned, as shown in FIG. 8. In this case, the output selecting means is so designed that it will select an image information outputting means in accordance with the priority for each delivery destination determined by the delivery destination determining means. Thus, an operation with a lower priority is executed in case an operation with a higher priority is not be executed for some reason, which improves the reliability of the delivery task.

In the above embodiment, the original 30 in the form of sheet are prepared which have the printed group number identification mark column 33 and the printed selection mark boxes 34 divided by information specific to each delivery destination belonging to the group numbers. The group number inputting means processes the image information of the original 30 in the form of sheet read by the scanner 2, and thus recognizes the identification mark (bar code) recorded in the identification mark column 33. A group number corresponding to the identification mark is obtained and inputted, the delivery destination determining means processes the image information of the original 30, and specifies boxes with a marking in the selection mark boxes 34. Delivery destinations corresponding to the specified boxes in the selection mark boxes 34 are determined based on the inputted group number information, referring to the group number administer table 12e. If the image information of originals is supposed to be always delivered to destinations belonging to the group numbers, then it is unnecessary to use the original 30 in the form of sheet.

For example, the system may be constituted as follows. When a group number is specified through ten-keys K1 operation in the delivery mode, the group number administer table 12e is referred to; nominated delivery destination identification codes corresponding to the group number is read; and destinations corresponding to the read codes are determined for delivery destinations of the original. This mark any media in the from of sheet unnecessary.

In the above embodiment, the present invention is applied to the data processing system provided with modes which enable a single image information outputting means as well as modes, such as the delivery and circulation modes, which enable a plurality of image information outputting means. This requires a mode selecting means. However, a model of the system provided with a single mode which enables a plurality of image information outputting means, does not require such an mode selecting means, naturally.

In the above embodiment, the reading of the original 30 to be delivered is started by, after touching the delivery mode area A2 in the touch panel display 81, operating the start key K2. If a scanner 2 provided with an original presence/absence detect mechanism, however, the detection of "original present" will automatically start the reading of the image of the original and the subsequent processing of the read image information. For the original 30 in a format containing the identification mark column 33, the system may be so constituted that it will recognize the bar code in the identification mark column 33, identify the applicable mode, and execute the operation in the mode.

Figure 9:
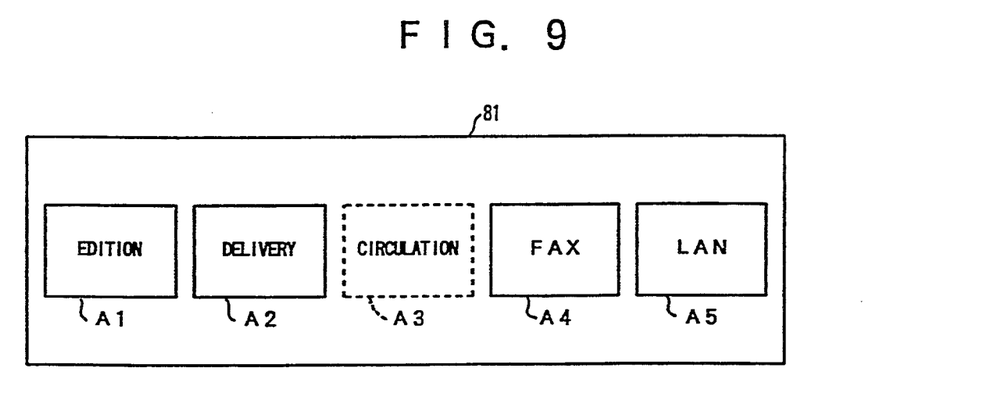
FIG. 9 is a plan view showing an example of the alteration of the initial screen of the touch panel display.

In this case, the system may be so constituted, for higher operability, that when it reads an original 30 for the delivery mode, for example, it will delete ineffective areas, such as "circulation", from the initial screen of the touch panel display 81, as shown in FIG. 9.

Figure 10:
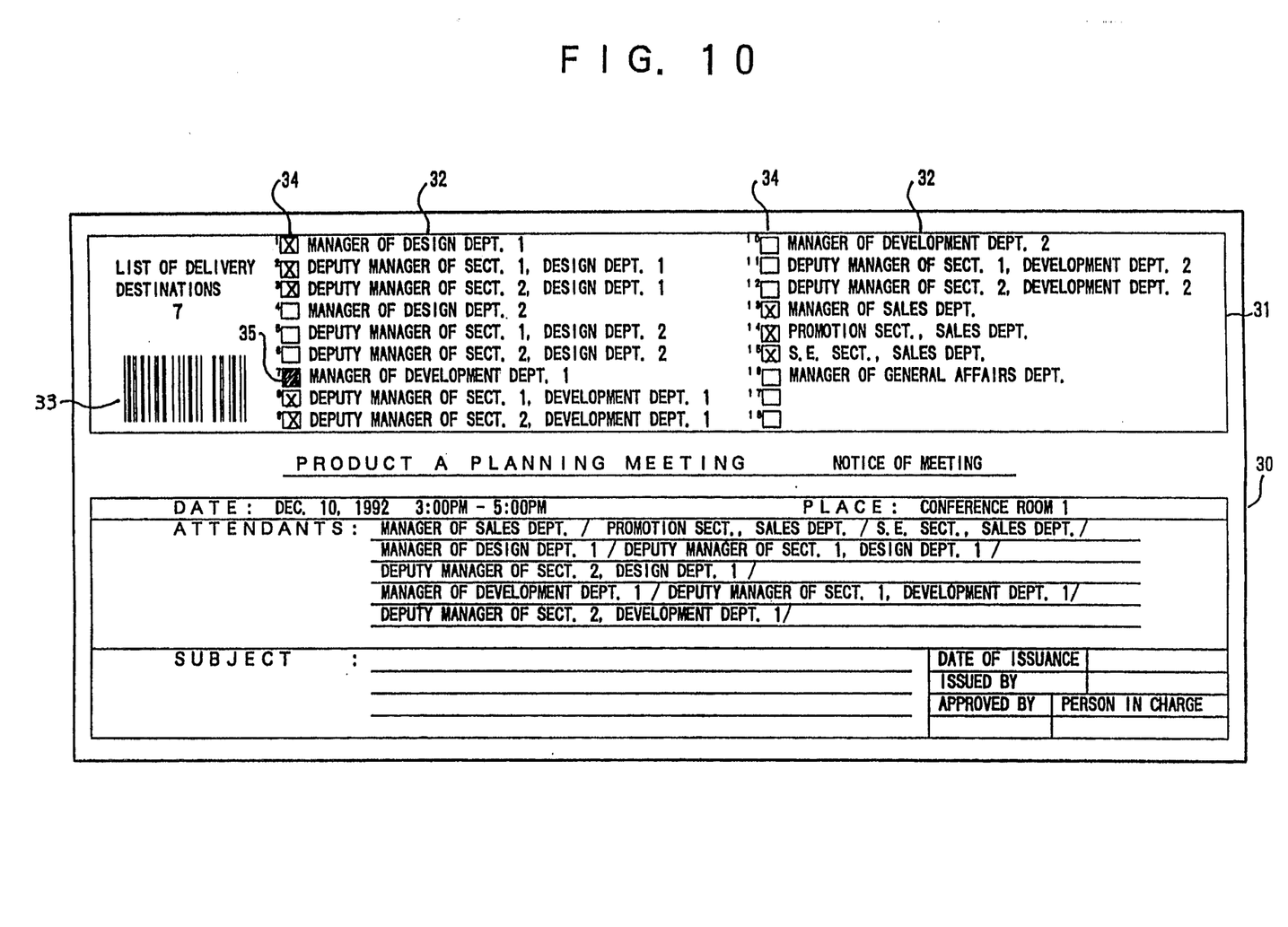
FIG. 10 is a plan view showing an example of the alteration of the format for a document to be delivered shown in FIG. 6.

In the above example of the embodiments, the image itself of the original 30 to be delivered is not transmitted to destinations. The system can be so constituted that the image of the original 30 will be transmitted to specified nominated delivery destinations by giving a mark 35 discriminated from the other marks for the purpose of specification, blacking out boxes in the selection mark boxes 34 corresponding to specified nominated destinations, as shown in FIG. 10, is one of the examples of such discriminating marking.

In the above embodiment, an operation for prompting users to confirm destinations may be added which displays applicable nominated delivery destination names on the touch panel display 81 when delivery destinations are determined. Naturally, any other alteration is feasible to the extent that it is involved in the subject matter of the present invention.

As mentioned above, the delivery destination and group number administer tables are provided in the present invnetion. The delivery destination administer table is provided for defining an image information outputting means for each delivery destination according to the identification code which identifies delivery destinations for each original. The group number administer table is provided for storing identification codes of delivery destinations belonging to a group number which specifies a plurality of delivery destinations optionally selected. When a group number is inputted through the inputting means, the group number administer table is referred to, and a plurality of delivery destinations specified by the inputted group number, are determined. Further, an image information outputting means is selected for each delivery destination determined through reference to the delivery destination administer table, and then the image information of the original read by the scanner is outputted to each delivery destination by a image information outputting means respectively selected. Therefore, the image information of the identical original is outputted by a plurality of different methods through simple operations without any waiting time. This provides a data processing system which improves the operability and processing efficiency as well.

If a plurality of image information outputting means are defined for each delivery destination in the delivery destination administer table with priorities assigned, it will provide a data processing system which additionally improves the reliability of the output task.

The use of original in the form of sheet having the printed identification mark column for group numbers and the printed selection mark boxes divided by information specific to each delivery destination belonging to the group numbers, facilitates the identification of delivery destinations of the image. Furthermore, specific delivery destinations are selectable among those belonging to a group number. This provides a data processing system excellent in practicality.

What is claimed is:

1. A data processing system for transmitting image data to a plurality of external apparatus, comprising:
    facsimile communication means for transmitting the image data to the external apparatus;
    network communication means for transmitting the image data to the external apparatus;
    means for designating a destination name for a destination to which the image data is transmitted;
    means for storing selection data to select one of the facsimile communication means and the network communication means to which image data is to be transmitted corresponding to the destination name designated by the designating means, wherein the storing means includes a first storage portion for storing the selection data, a second storage portion for storing facsimile numbers designating the external apparatus to which data is to be transmitted through the facsimile communication means if the facsimile communication means has been selected by the selection data, and a third storage portion for storing network address data designating the external apparatus to which image data is to be transmitted through the network communication means if the network communication means has been selected by the selection data; and
    means for reading out the selection data from the storing means corresponding to the designated destination name if the destination name is designated by the designating means and for transmitting the image data to one of the facsimile communication means and the network communication means designated by the selection data.

2. A data processing system for transmitting image data to a plurality of external apparatus, comprising:
    facsimile communication means for transmitting the image data to the external apparatus;
    network communication means for transmitting the image data to the external apparatus;
    means for reading a sheet on which destination names which designate destinations of image data transmission have been recorded;
    means for storing selection data to select one of the facsimile communication means and the network communication means to which data is to be transmitted corresponding to the destination names recorded on the sheet read by the reading means, wherein the storing means includes a first storage portion for storing the selection data, a second storage portion for storing facsimile numbers designating the external apparatus to which image data is to be transmitted through the facsimile communication means if the facsimile communication means has been selected by the selection data, and a third storage portion for storing network address data designating the external apparatus to which image data is to be transmitted through the network communication means if the network communication means has been selected by the selection data; and
    means for reading out the selection data corresponding to designated destination names on the sheet when the sheet is read by the reading means and for transmitting the image data to one of the facsimile communication means and the network communication means designated by the selection data.

3. A data processing system according to claim 2, wherein the sheet has a priority designating portion for designating priorities when transmitting data if a plurality of destinations have been designated in the destination designating portion; and
    the image data transmitting means includes means for performing the transmission of the image data sequentially to the facsimile communication means or the network communication means designated by the selection data for designated destinations according to the orders for transmission as designated in the priority designating portion of the sheet.

4. A data processing system for transmitting image data to a plurality of external apparatus, comprising:
    means for reading an image of an original;

means for generating image data corresponding to the image read by the reading means;

means for forming an image on an image carrier corresponding to the image data generated by the generating means;

means for transferring the image formed on the image carrier onto a transfer medium;

facsimile communication means for transmitting the image data generated by the generating means to the external apparatus;

network communication means for transmitting the image data generated by the generating means to the external apparatus;

means for designating a destination name of a destination to which the image data is transmitted when transmitting the image data to the external apparatus;

means for storing selection data to select one of the facsimile communication means, the network communication means, and the image forming means to which image data is to be transmitted corresponding to the destination name designated by the designating means, wherein the storing means includes a first storage portion for storing the selection data, a second storage portion for storing facsimile numbers designating the external apparatus to which image data is to be transmitted through the facsimile communication means if the facsimile communication means has been selected by the selection data, and a third storage portion for storing network address data designating the external apparatus to which image data is to be transmitted through the network communication means if the network communication means has been selected by the selection data; and control means for reading the selection data from the storing means corresponding to the designated destination name if the destination name is designated by the designating means and for executing the transmission of the image data to one of the facsimile communication means, the network communication means, and the image forming means designated by the selection data.

5. A data processing system for transmitting image data to a plurality of external apparatus, comprising:

first reading means for reading an image on an original;

means for generating image data corresponding to the image read by the reading means;

means for forming an image on an image carrier corresponding to the image data generated by the generating means;

means for transferring the image formed on the image carrier onto a transfer medium;

facsimile communication means for transmitting the image data generated by the generating means to the external apparatus;

network communication means for transmitting the image data generated by the generating means to the external apparatus;

second reading means for reading a destination designation sheet on which the names of destinations for transmitting the image data to have been recorded;

means for discriminating destination names read by the second reading means;

means for storing selection data to select one of the facsimile communication means, the network communication means, and the image forming means to which image data is to be transmitted corresponding to destination names discriminated by the discriminating means, wherein the storing means includes a first storage portion for storing the selection data, a second storage portion for storing facsimile numbers designating the external apparatus to which image data is to be transmitted through the facsimile communication means if the facsimile communication means has been selected by the section data, and a third storage portion for storing network address data designating the external apparatus to which image data is to be transmitted through the network communication means if the network communication means has been selected by the selection data; and control means for transmitting the image data to one of the facsimile communication means, the network communication means, and the image forming means designated by the selection data read out from the storing means corresponding to the destination names discriminated by the discriminating means when the second reading means reads the destination designating sheet.

* * * * *